United States Patent
Burton et al.

(10) Patent No.: US 9,622,142 B2
(45) Date of Patent: Apr. 11, 2017

(54) SYSTEM AND METHOD EN-ROUTE WIRELESS NETWORK ACCESS

(71) Applicant: International Business Machines Corporation, Armonk, NY (US)

(72) Inventors: Peter Burton, Vancouver (CA); Donna K. Byron, Petersham, MA (US); Manav Gupta, Brampton (CA)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 14/467,254

(22) Filed: Aug. 25, 2014

(65) Prior Publication Data
US 2016/0057691 A1     Feb. 25, 2016

(51) Int. Cl.
*H04W 36/32*     (2009.01)
*H04W 8/08*      (2009.01)
(Continued)

(52) U.S. Cl.
CPC ........... *H04W 36/32* (2013.01); *H04W 76/02* (2013.01); *H04W 8/20* (2013.01); *H04W 8/22* (2013.01);
(Continued)

(58) Field of Classification Search
CPC ..... H04W 48/20; H04W 24/10; H04W 36/32; H04W 76/02; H04W 8/08; H04W 88/08
See application file for complete search history.

(56) References Cited

U.S. PATENT DOCUMENTS 6,898,432 B1   5/2005   Jiang
8,400,954 B2   3/2013   Lee
(Continued)

FOREIGN PATENT DOCUMENTS

CN   102111761 B   1/2014
EP   1209930 B1    4/2006
(Continued)

OTHER PUBLICATIONS

"Extensible Authentication Protocol (EAP) Early Authentication Problem Statement (RFC5836)", An IP.com Prior Art Database Technical Disclosure, Authors et. al.: Internet Society Y. Ohba Ed. Q. Wu Ed. 1 other persons credited, Original Publication Date: Apr. 1, 2010, IP.com No. IPCOM000195258D, IP.com Electronic Publication: Apr. 27, 2010, pp. 1-20, Copyright: (c) 2010 IETF Trust and the persons identified as the, <http://ip.com/IPCOM/000195258>.
(Continued)

*Primary Examiner* — Chi H Pham
*Assistant Examiner* — Shailendra Kumar
(74) *Attorney, Agent, or Firm* — Edward P. Li

(57) ABSTRACT

A method, a computer program product, and a computer system for en-route wireless network access are provided. A server receives from a mobile device information of a route along which the mobile device moves. The server determines registered wireless access points along the route. The server sends information of the mobile device and user credentials to one or more providers of the registered wireless access points. From the one or more providers, the server receives connection information of the registered wireless access points. The server sends the connection information to the mobile device. Based on the connection information, the mobile device establishes connectivity with respective ones of the registered wireless access points en-route.

15 Claims, 5 Drawing Sheets

(51) Int. Cl.
*H04W 76/02* (2009.01)
*H04W 8/20* (2009.01)
*H04W 8/22* (2009.01)
*H04W 36/00* (2009.01)
*H04W 12/06* (2009.01)
*H04W 12/04* (2009.01)
*H04W 84/12* (2009.01)

(52) U.S. Cl.
CPC ............ *H04W 12/04* (2013.01); *H04W 12/06* (2013.01); *H04W 36/0061* (2013.01); *H04W 36/0072* (2013.01); *H04W 84/12* (2013.01)

(56) References Cited

U.S. PATENT DOCUMENTS

| | | | |
|---|---|---|---|
| 8,496,181 B2 | 7/2013 | Wang | |
| 8,590,023 B2* | 11/2013 | Gupta | H04W 12/06 370/329 |
| 8,630,637 B2* | 1/2014 | Garg | H04W 36/10 455/432.1 |
| 2014/0003263 A1* | 1/2014 | Sheriff | H04W 36/30 370/252 |
| 2015/0319660 A1* | 11/2015 | Helbert | H04W 36/245 455/436 |
| 2015/0382196 A1* | 12/2015 | Hillier | H04W 4/008 726/7 |
| 2016/0019746 A1* | 1/2016 | Lyons | G07F 17/3211 463/25 |

FOREIGN PATENT DOCUMENTS

| | | |
|---|---|---|
| EP | 2096798 B1 | 12/2012 |
| WO | 2007082913 A1 | 7/2007 |
| WO | 2007145625 A1 | 12/2007 |
| WO | WO-2007145625 A1 * | 12/2007 |
| WO | 2012094677 A2 | 7/2012 |
| WO | 2013043869 A1 | 3/2013 |
| WO | 2013095451 A1 | 6/2013 |
| WO | 2013191820 A1 | 12/2013 |

OTHER PUBLICATIONS

"Fast linking", An IP.com Prior Art Database Technical Disclosure, Authors et. al.: Motorola, Inc. Kovyazin, Rustam, Original Publication Date: Aug. 15, 2012, IP.com No. IPCOM000220920D, IP.com Electronic Publication: Aug. 15, 2012, Copyright: © 2012 Motorola Solutions, Inc., <http://ip.com/IPCOM/000220920>.

* cited by examiner

SYSTEM AND METHOD EN-ROUTE WIRELESS NETWORK ACCESS

TECHNICAL FIELD OF THE INVENTION

The present invention relates generally to wireless network access, and more particularly to en-route wireless network access.

BACKGROUND

With the surge in mobile computing, being permanently connected to the internet is becoming more important. Smartphones provide the ability to conduct many business and personal tasks, while being mobile and using the cellular network for communication. This can be expensive due to costly data plan rates and roaming charges. To avoid such charges, mobile users with mobile devices can leverage wireless technology, and seek open and available wireless access points. It works well when the user is not in-motion. However, if the user is in-motion (e.g., in a car, on a train or bus, or on foot), after moving a short distance, the user will become disconnected from the wireless access point and unable to conduct tasks that require connectivity. The user is now faced with searching again for any available wireless access points, and once again negotiating connectivity for each access point, specifying credentials for different access points each time.

Cellular network providers and network equipment manufacturers have already designed and built equipment, which broadcasts its availability and authenticates users for secure usage of the network service. Mobile phones can roam across multiple networks automatically. However, current cellular capability does not proactively determine travel directions based on multiple GPS location readings, seek available connectivity options based on the travel directions, and pre-authenticate users and users' devices before the users arrive in a given area of available and open wireless network coverage.

SUMMARY

In one aspect, a method for en-route wireless network access is provided. In the method, from a mobile device, a server receives information of a route along which the mobile device moves. In the method, the server determines registered wireless access points along the route. In the method, the server sends information of the mobile device and user credentials to one or more providers of the registered wireless access points. In the method, from the one or more providers, the server receives connection information of the registered wireless access points. In the method, the server sends the connection information to the mobile device. Based on the connection information, the mobile device establishes connectivity with respective ones of the registered wireless access points en-route.

In another aspect, a computer program product for en-route wireless network access is provided. The computer program product comprises a computer readable storage medium having program code embodied therewith. The program code on a server is executable to receive, from a mobile device, information of a route, wherein the mobile device moves along the route. The program code on the server is executable to determine registered wireless access points along the route. The program code on the server is executable to send, to one or more providers of the registered wireless access points, information of the mobile device and user credentials. The program code on the server is executable to receive, from the one or more providers, connection information of the registered wireless access points. The program code on the server is executable to send, to the mobile device, the connection information. Based on the connection information, the mobile device establishes connectivity with respective ones of the registered wireless access points en-route.

In yet another aspect, a computer system for en-route wireless network access is provided. The computer system comprises one or more processors, one or more computer-readable tangible storage devices, and program instructions stored on at least one of the one or more computer-readable tangible storage devices for execution by at least one of the one or more processors. The program instructions are executable for a server to receive, from a mobile device, information of a route, wherein the mobile device moves along the route. The program instructions are executable for the server to determine registered wireless access points along the route. The program instructions are executable for the server to send, to one or more providers of the registered wireless access points, information of the mobile device and user credentials. The program instructions are executable for the server to receive, from the one or more providers, connection information of the registered wireless access points. The program instructions are executable for the server to send, to the mobile device, the connection information. Based on the connection information, the mobile device establishes connectivity with respective ones of the registered wireless access points en-route.

DETAILED DESCRIPTION

Embodiments of the present invention provide a system and method for dynamic wireless connectivity for a mobile device which is in-motion. The system and method uses the current GPS location and the traveling direction of the mobile device to determine a route of the mobile device, and correlate the location and direction data with a reference source of known available wireless access points on the route.

Figure 1:
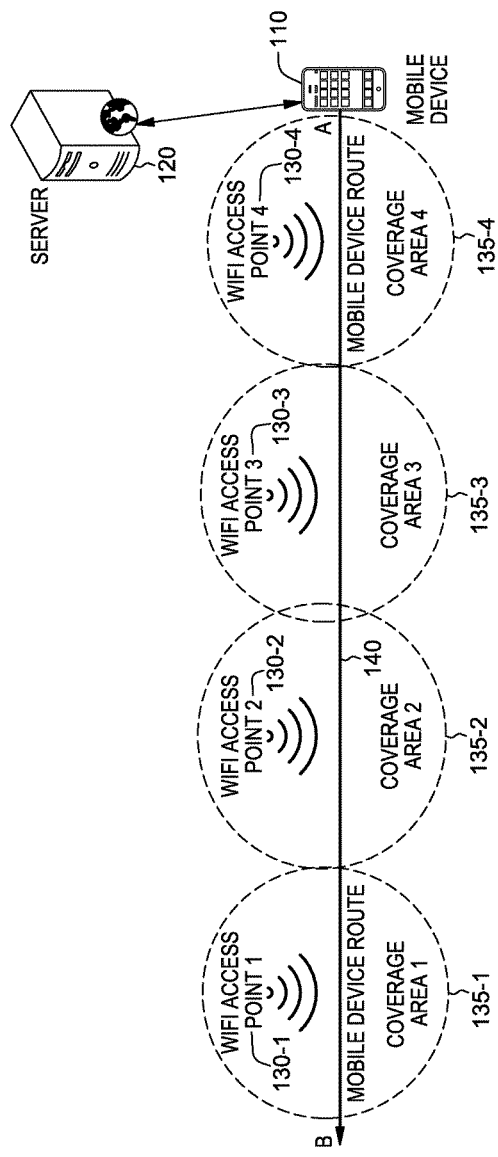
FIG. 1 is a diagram illustrating a mobile device, a server, and WIFI access points along a route, in accordance with one embodiment of the present invention.

FIG. 1 is a diagram illustrating mobile device 110, server 120, and WIFI access points (130-1 through 130-4) along mobile device route 140, in accordance with one embodiment of the present invention. Mobile device 110 moves from location A to location B along mobile device route 140. Along route 140, WIFI access points 1 through 4 (130-1 through 130-4) are available for connectivity of mobile device 110. WIFI access points 1 through 4 (130-1 through 130-4) have coverage areas 1 through 4 (135-1 through 135-4), respectively. WIFI is a local area wireless technology that allows an electronic device to exchange data or connect to the internet using 2.4 GHz UHF and 5 GHz SHF radio waves.

Referring to FIG. 1, mobile device 110 is a laptop, a tablet, a smartphone, or any mobile electronic device capable of receiving input from a user, executing computer program instructions, and communicating with another computing system (such as server 120). Through communicating with server 120, mobile device 110 establishes connectivity to WIFI access points 1 through 4 (130-1 through 130-4) en-route. Server 120 is located on a computer device which is described in FIG. 4.

In the embodiment of the invention, processes for establishing connectivity of mobile device 110 to WIFI access points 1 through 4 (135-1 through 135-4) is conducted prior to arrival of mobile device 110 to each of WIFI access points 1 through 4 (135-1 through 135-4). Before mobile device 110 moves out one coverage area and enters a next coverage area, the system processes negotiation with the next available WIFI access point; thus, connectivity between mobile device 110 and the next available WIFI access point is seamlessly established. For example, shown as in FIG. 1, before mobile device 110 moves out coverage area 4 (135-4), the system processes negotiation with WIFI access points 1-3 (130-1 through 130-3) and pre-authenticates mobile device 110 for connectivity with WIFI access points 1-3 (130-1 through 130-3). Thus, the system establishes authorized access to WIFI access points 1-3 (130-1 through 130-3) before the mobile device enters coverage areas 1-3 (135-1 through 135-3), and mobile device 110 does not experience any loss of connectivity along mobile device route 140.

Figure 2A:
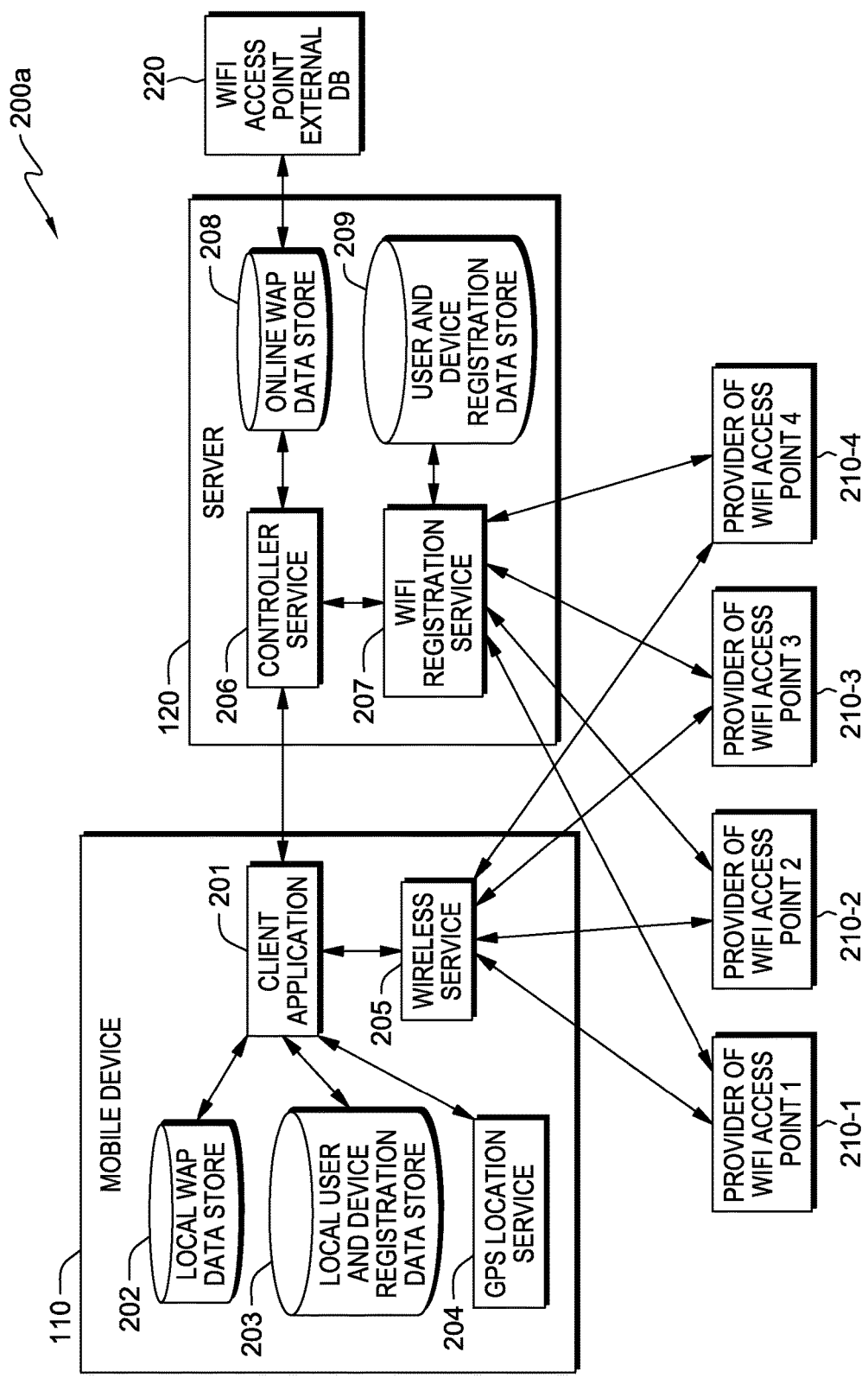
FIG. 2(A) is a diagram illustrating a first exemplary system for en-route wireless network access, in accordance with a first embodiment of the present invention.

FIG. 2(A) is a diagram illustrating system 200a for en-route wireless network access, in accordance with a first embodiment of the present invention. System 200a comprises mobile device 110, server 120, WIFI access point external database 220, and a plurality of provides of WIFI access points. Shown in FIG. 2(A), the plurality of the providers, for example, are providers 210-1 through 210-4 of WIFI access points 1 through 4 (130-1 through 130-4 shown in FIG. 1).

Referring to FIG. 2(A), mobile device 110 comprises client application 201 which has functionality on the mobile device side to establish connectivity between the mobile device and wireless access points en-route. Client application 201 communicates with other components on mobile device 110 and controller service 206 on server 120. Controller service 206 has functionality on the server side to pre-determine and establish secure access between the mobile device and wireless access points en-route, which communicates with client application 201 and other components on server 120.

The above-mentioned other components on mobile device 110 comprise local WAP (Wireless Access Point) data store 202, local user and device registration data store 203, GPS (Global Positioning System) location service 204, and wireless service 205. Local WAP data store 202 maintains, on mobile device 110, data of wireless access points (such as WIFI access points 1 through 4 (130-1 through 130-4)). Local user and device registration data store 203 maintains, on mobile device 110, data of mobile device 110 and the user thereof, such as data of SSID (Service Set Identification), username, and password credentials. GPS location service 204 provides information of the location and the route of mobile device 110. Wireless service 205 communicates with providers 210-1 through 210-4 of WIFI access points 1 through 4 (130-1 through 130-4), and it provides connectivity between mobile device 110 and WIFI access points (130-1 through 130-4) en-route.

The above-mentioned other components on server 120 comprise WIFI registration service 207, online WAP data store 208, and user and device registration data store 209. WIFI registration service 207 communicates with providers 210-1 through 210-4 of WIFI access points 1 through 4 (130-1 through 130-4). Online WAP data store 208 maintains, on server 120, data of all pre-determined and pre-authorized wireless access points (such as WIFI access points 1 through 4 (130-1 through 130-4)). Online WAP data store 208 communicates with WIFI access point external database 220 and retrieves relevant data stored on the external database. User and device registration data store 209 maintains, on server 120, data of mobile device 110 and the user thereof, such as data of SSID (Service Set Identification), username, and password credentials.

Referring to FIG. 2(A), server 120 retrieves, from user and device registration data store 209, user's credentials (such as name, address, user ID, password, email address, billing information, etc.) and device credentials (such as device MAC (media access control) address, and IP address). Server 120 communicates with providers 210-1 through 210-4 of WIFI access points 1 through 4 (130-1 through 130-4). The credentials retrieved are used to negotiate the access to WIFI access points 1 through 4 (130-1 through 130-4), before mobile device 110 enters coverage areas 1 through 4 (135-1 through 135-4). Access to WIFI access points 1 through 4 (130-1 through 130-4) is qualified and approved before mobile device 110 arrives in coverage areas 1 through 4 (135-1 through 135-4). Appropriate or required billing services are then activated when mobile device 110 is connected to WIFI access points 1 through 4 (130-1 through 130-4), and the user of mobile device 110 is billed accordingly by providers (210-1 through 210-4) of WIFI access points 1 through 4 (130-1 through 130-4). The user of mobile device 110 moves from one wireless coverage area into another potentially overlapping wireless coverage area, without experiencing loss of wireless connectivity.

Figure 2B:
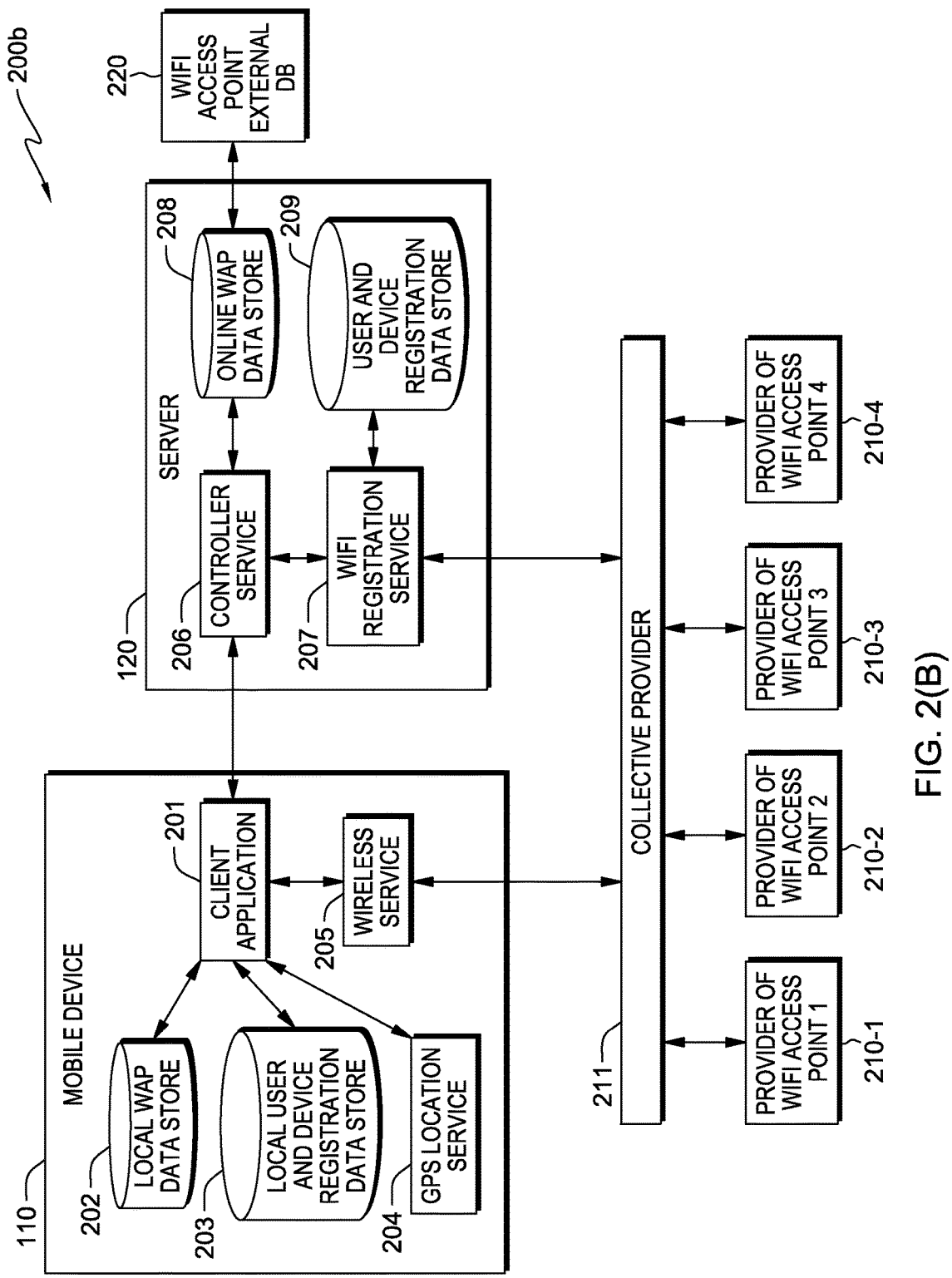
FIG. 2(B) is a diagram illustrating a second exemplary system for en-route wireless network access, in accordance with a second embodiment of the present invention.

FIG. 2(B) is a diagram illustrating system 200b for en-route wireless network access, in accordance with a second embodiment of the present invention. In the second embodiment, system 200b comprises mobile device 110, server 120, WIFI access point external database 220, and providers 210-1 through 210-4 of WIFI access points 1 through 4 (130-1 through 130-4 shown in FIG. 1); these components of system 200b are identical to those of system 200a. However, system 200b comprises collective provider 211.

Referring to FIG. 2(B), collective provider 211 collectively groups providers 210-1 through 210-4 of WIFI access points 1 through 4 (130-1 through 130-4 shown in FIG. 1). Billing to the user of mobile device 110 is performed centrally by collective provider 211 rather than by individual ones of providers 210-1 through 210-4. Wireless service 205 on mobile device 110 and WIFI registration service 207 on server 120 communicate with collective provider 211 rather than individual ones of providers 210-1 through 210-4.

Figure 3:
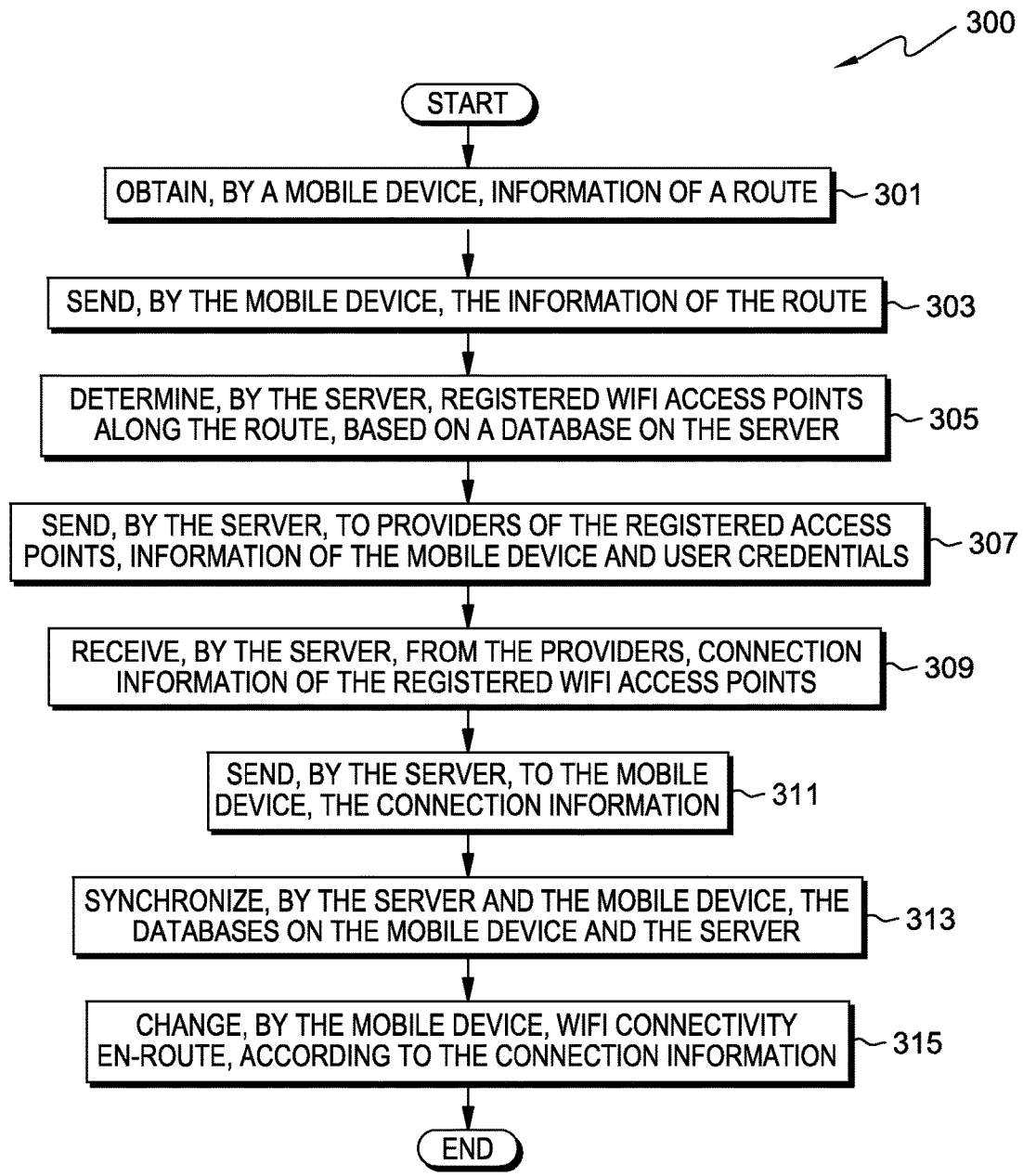
FIG. 3 is a flowchart illustrating operational steps for en-route wireless network access, in accordance with one embodiment of the present invention.

FIG. 3 is flowchart 300 illustrating operational steps for en-route wireless network access, in accordance with one embodiment of the present invention. At step 301, mobile device 110 (shown in FIGS. 1, 2(A), and 2(B)) obtains information of a route. In an embodiment, the information of the route is obtained from GPS location service 204 shown in FIG. 2(A) and FIG. 2(B). In another embodiment, mobile device 110 receives route information that is pre-planned and input by the user of the mobile device. At step 303, mobile device 110 sends the information of route to server 120 (shown in FIGS. 1, 2(A), and 2(B)).

Referring to FIG. 3, at step 305, server 120 determines registered WIFI access points along the route, based on a database on server 120. In the embodiment, the database is online WAP data store 208 (shown in FIG. 2(A) and FIG. 2(B)). Online WAP data store 208 communicates with WIFI access point external database 220 and retrieves data store on the external database. In response to receiving the list from mobile device 110, server 120 checks online WAP data store 208 and chooses from the list the WIFI access points registered by mobile device 110. In the example shown in the embodiment, the registered WIFI access points are WIFI access points 1 through 4 (130-1 through 130-4) shown in FIG. 1. At step 307, server 120 sends, to providers 210-1 through 210-4 (shown in FIG. 2(A)) or collective provider 211 (shown in FIG. 2(B)), information of mobile device 110 and credentials of the user of the mobile device. After negotiating the access to WIFI access points 1 through 4 (130-1 through 130-4), at step 309, server 120 receives, from providers 210-1 through 210-4 or collective provider 211, connection information of the registered WIFI access points. At step 311, server 120 sends the connection information to mobile device 110.

At step 313, server 120 and mobile device 110 synchronize databases on server 120 and mobile device 110. The databases include local WAP data store 202 on mobile device 110, local user and device registration data store 203 on mobile device 110, online WAP data store 208 on server 120, and user and device registration data store 209 on server 120. At step 315, mobile device 110 dynamically changes WIFI connectivity en-route, according to the connectivity information. For example, at this step, when mobile device 110 enters coverage area 4 (135-4) shown in FIG. 1, it establishes connectivity to WIFI access point 4 (130-4) shown in FIG. 1; when mobile device 110 leaves coverage area 4 (135-4) and enters coverage area 3 (135-3) shown in FIG. 1, it establishes connectivity to WIFI access point 3 (130-3) shown in FIG. 1. Therefore, mobile device 110 establishes connectivity to respective ones of WIFI access points 1 through 4 (135-1 through 135-4), when it moves along mobile device route 140.

In another embodiment, mobile device 110 collects data of WIFI access points on the route and stores the data on a database on mobile device 110. The database is local WAP data store 202 (shown in FIG. 2(A) and FIG. 2(B)). Based on the data collected, mobile device 110 generates a list of the WIFI access points along the route. Mobile device 110 sends the list to server 120 (shown in FIGS. 1, 2(A), and 2(B)). Thus, the server 120 selects from the list at least one of the registered WIFI access points along the route.

Figure 4:
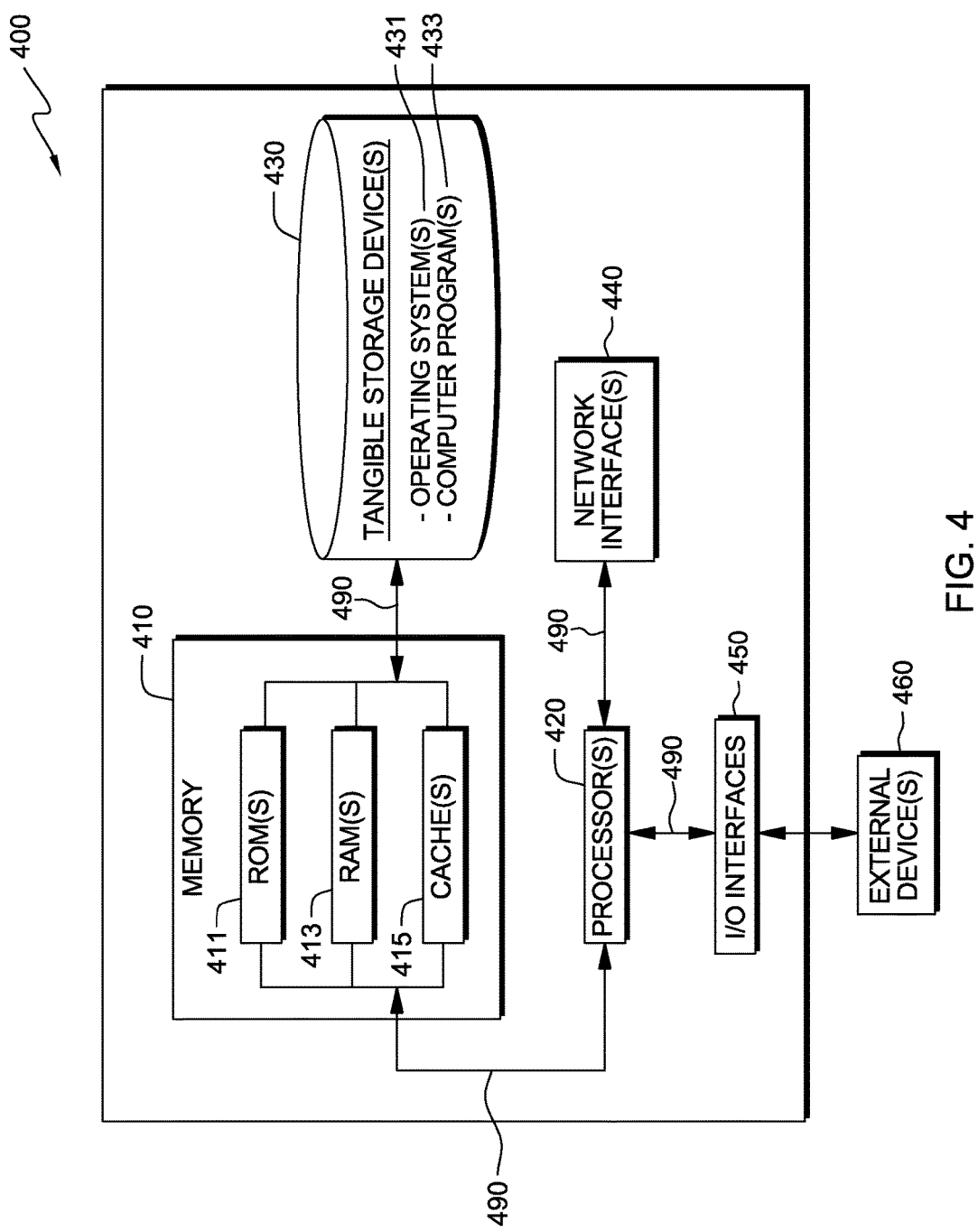
FIG. 4 is a diagram illustrating components of a computer device hosting a server shown in FIG. 1, in accordance with one embodiment of the present invention.

FIG. 4 is a diagram illustrating components of a computer device hosting a server shown in FIG. 1, in accordance with one embodiment of the present invention. It should be appreciated that FIG. 4 provides only an illustration of one implementation and does not imply any limitations with regard to the environment in which different embodiments may be implemented.

Referring to FIG. 4, computer device 400 includes processor(s) 420, memory 410, tangible storage device(s) 430, network interface(s) 440, and I/O (input/output) interface(s) 450. In FIG. 4, communications among the above-mentioned components of computing device 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer-readable tangible storage device(s) 430. Computing device 400 further includes I/O interface(s) 450. I/O interface(s) 450 allows for input and output of data with external device(s) 460 that may be connected to computing device 400. Computing device 400 further includes network interface(s) 440 for communications between computing device 400 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for en-route wireless network access, the method comprising:
   receiving, by a server, from a mobile device, information of a pre-planned route, wherein the mobile device moves along the pre-planned route;
   determining, by the server, registered wireless access points along the pre-planned route;
   sending, by the server, to one or more providers of the registered wireless access points along the pre-planned route, information of the mobile device and user credentials;
   receiving, by the server, from the one or more providers, connection information of the registered wireless access points along the pre-planned route;
   sending, by the server, to the mobile device, the connection information of the registered wireless access points along the pre-planned route, prior to arrival of the mobile device to coverage areas of respective ones of the registered wireless access points along the pre-planned route; and
   wherein the mobile device, based on the connection information of the registered wireless access points along the pre-planned route, establishes connectivity with the respective ones of the registered wireless access points en-route.

2. The method of claim 1, further comprising:
   synchronizing, by the server and the mobile device, databases respectively on the server and the mobile device.

3. The method of claim 1, further comprising:
   collecting, by the mobile device, data of the wireless access points along the pre-planned route;
   generating, by the mobile device, a list of the wireless access points along the pre-planned route, based on the data of the wireless access points along the route;
   sending, by the mobile device, the list to the server;
   receiving, by the server, from the mobile device, the list of wireless access points on the pre-planned route; and
   selecting from the list, by the server, at least one of the registered wireless access points along the pre-planned route.

4. The method of claim 3, wherein the mobile device obtains the information of the route from a global positioning system.

5. The method of claim 3, wherein the mobile device receives the information of the route that is input by a user of the mobile device.

6. A computer program product for en-route wireless network access, the computer program product comprising a computer readable storage medium having program code embodied therewith, the program code executable to:
   receive, by a server, from a mobile device, information of a pre-planned route, wherein the mobile device moves along the pre-planned route;
   determine, by the server, registered wireless access points along the pre-planned route;
   send, by the server, to one or more providers of the registered wireless access points along the pre-planned route, information of the mobile device and user credentials;

receive, by the server, from the one or more providers, connection information of the registered wireless access points along the pre-planned route;

send, by the server, to the mobile device, the connection information of the registered wireless access points along the pre-planned route, prior to arrival of the mobile device to coverage areas of respective ones of the registered wireless access points along the pre-planned route; and wherein the mobile device, based on the connection information of the registered wireless access points along the pre-planned route, establishes connectivity with the respective ones of the registered wireless access points en-route.

7. The computer program product of claim 6, further comprising the program code executable to:
synchronize, by the server and the mobile device, databases respectively on the server and the mobile device.

8. The computer program product of claim 6, further comprising the program code executable to:
collect, by the mobile device, data of the wireless access points along the pre-planned route;
generate, by the mobile device, a list of the wireless access points along the pre-planned route, based on the data of the wireless access points along the route;
send, by the mobile device, the list to the server;
receive, by the server, from the mobile device, the list of wireless access points on the route, wherein the mobile device moves along the pre-planned route; and
select from the list, by the server, at least one of the registered wireless access points along the pre-planned route.

9. The computer program product of claim 8, wherein the mobile device obtains the information of the route from a global positioning system.

10. The computer program product of claim 8, wherein the mobile device receives the information of the route that is input by a user of the mobile device.

11. A computer system for en-route wireless network access, the computer system comprising:
one or more processors, one or more computer-readable tangible storage devices, and program instructions stored on at least one of the one or more computer-readable tangible storage devices for execution by at least one of the one or more processors, the program instructions executable to:

receive, by a server, from a mobile device, information of a pre-planned route, wherein the mobile device moves along the pre-planned route;

determine, by the server, registered wireless access points along the pre-planned route;

send, by the server, to one or more providers of the registered wireless access points along the pre-planned route, information of the mobile device and user credentials;

receive, by the server, from the one or more providers, connection information of the registered wireless access points along the pre-planned route;

send, by the server, to the mobile device, the connection information of the registered wireless access points along the pre-planned route, prior to arrival of the mobile device to coverage areas of respective ones of the registered wireless access points along the pre-planned route; and wherein the mobile device, based on the connection information of the registered wireless access points along the pre-planned route, establishes connectivity with the respective ones of the registered wireless access points en-route.

12. The computer system of claim 11, further comprising the program instructions executable to:
synchronize, by the server and the mobile device, databases respectively on the server and the mobile device.

13. The computer system of claim 11, further comprising the program instructions executable to:
collect, by the mobile device, data of the wireless access points along the pre-planned route;
generate, by the mobile device, a list of the wireless access points along the pre-planned route, based on the data of the wireless access points along the route;
send, by the mobile device, the list to the server;
receive, by the server, from the mobile device, the list of wireless access points on the route, wherein the mobile device moves along the pre-planned route; and
select from the list, by the server, at least one of the registered wireless access points along the pre-planned route.

14. The computer system of claim 13, wherein the mobile device obtains the information of the route from a global positioning system.

15. The computer system of claim 13, wherein the mobile device receives the information of the route that is input by a user of the mobile device.

* * * * *